Patented May 14, 1946

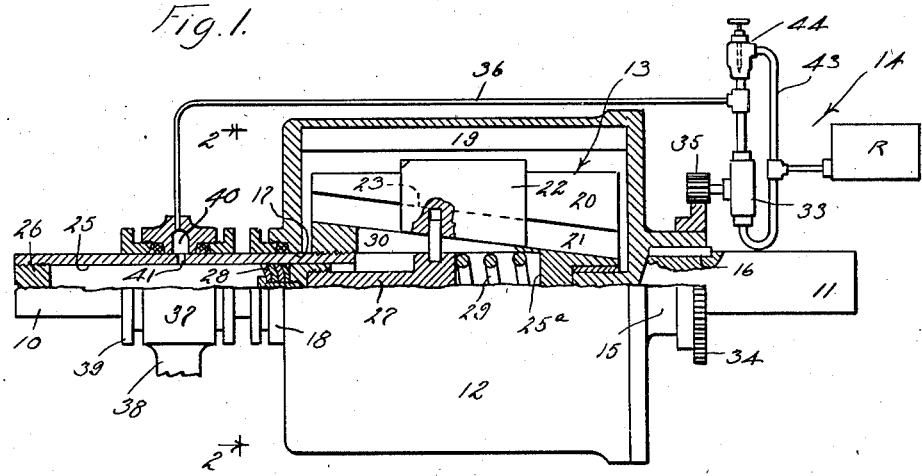

2,400,186

UNITED STATES PATENT OFFICE 2,400,186

SPEED CONTROL DRIVE

Arthur L. Armentrout, Long Beach, Calif.

Application December 2, 1942, Serial No. 467,623

9 Claims. (Cl. 192—58)

This invention relates to mechanisms for controlling the relative speeds of related elements and has more particular reference to mechanisms for the transmission of rotation between a driving element and a driven element. A general object of this invention is to provide a simple compact and dependable mechanism operable to provide for the constant speed operation of the driven element, even though one of the elements is characterized by variable speed operation.

Another object of this invention is to provide a drive or rotation transmitting mechanism that operates to automatically maintain a substantially constant speed of rotation of the driven element when the speed of rotation of the driving element is variable. In many situations an auxiliary A. C. generator or other auxiliary mechanism that is intended to operate at a constant speed is driven by a prime mover whose speed of operation is variable due to the imposition of variable loads on the main element or machine being driven by the prime mover. When employed in such situations the mechanism of this invention automatically maintains a substantially constant speed of operation of the auxiliary driven unit.

Another object of this invention is to provide a transmission or mechanism of the character referred to that may be readily adjusted or controlled to vary the differential in the speed of operation of the drive unit and driven unit. Simple operation of a single valve adjusts or varies the differential in the speed of operation of the two units.

Another object of this invention is to provide a drive or mechanism of the character mentioned that is quiet and efficient in operation and that embodies a minimum number of simple parts.

Another object of this invention is to provide a drive of the character referred to in which the transmission of rotation is through a fluid medium so that gears are not required for the transmission of the rotation.

A further object of this invention is to provide a drive of the character mentioned that requires no outside source of energy and that is entirely self-contained in a small unit.

The various objects and features of my invention will be fully understood from the following detailed description of a typical preferred form and application of my invention, throughout which description reference is made to the accompanying drawing, in which:

Fig. 1 is a longitudinal detailed sectional view of the mechanism provided by this invention with portions of the device appearing in side elevation and Fig. 2 is an enlarged transverse detailed sectional view taken as indicated by line 2—2 on Fig. 1 with a portion of the casing broken away to illustrate the internal parts.

The drive or transmission of the present invention is adapted for numerous applications or installations and may be varied somewhat to suit it for given uses. In the following detailed description I will describe a typical form of the invention serving to connect a driven shaft and a drive shaft. It is to be understood that the present disclosure is merely illustrative and is not to be construed as limiting or restricting the scope or application of the invention.

It may be considered that the drive shaft 10 has a variable speed of rotation due to varying loads imposed on its prime mover or for other causes, and it may be assumed that it is desired to drive the driven shaft 11 at a constant rate of speed so that it may operate an A. C. generator or other machine whose speed of operation should be kept substantially constant. I have shown the drive shaft and driven shaft arranged in longitudinal alignment.

The drive of the present invention may be said to comprise, generally, a casing 12 rotatable with one shaft, a rotor 13 in the case rotatable with the other shaft, and a control 14 responsive to the speed of rotation of one of the shafts for governing the action of the rotor.

The casing 12 contains the rotation transmitting liquid and houses the rotor 13. In the construction illustrated the casing 12 is connected with the driven shaft 11 so that the casing and shaft rotate as a unit. The casing is a hollow, generally cylindrical structure arranged in concentric relation with the common axis of the shafts 10 and 11. I have shown the driven shaft 11 received in a hub or boss 15 formed on one end of the casing 12 and a key connection 16 serves to connect the casing with the shaft. The other end wall of the casing 12 has a central opening 17 which receives the drive shaft 10. A packing gland 18 or other appropriate means is provided at the opening 17 to seal about the shaft 10 to prevent the leakage of the liquid from the casing 12. The driven shaft 10 extends into the casing 12 to carry the rotor 13.

The wall of the casing 12 has a multiplicity of blades or vanes 19 which are acted upon by the rotating liquid put into motion by the rotor 13. The vanes 19 extend longitudinally of the casing 12 and I prefer to provide a continuous series of spaced vanes 19 on the internal surface of the casing wall. The vanes 19 are shaped to be effective in the transmission of the rotation of the fluid to the casing. As illustrated in Fig. 2 of the drawing the vanes 19 are pitched or curved rearwardly relative to the direction of fluid circulation in the casing 12 to be most efficient in imparting the movement of the liquid to the casing.

The rotor 13 may be considered as the driving element or force applying element of the mechanism, being operable to impart movement to the liquid in the casing. The rotor 13 is threaded or otherwise fixed on the inner end of the drive shaft 10 within the casing 12. In practice the rotor 13 may be a cylindrical block-like part and is arranged so that its outer surface or periphery is spaced some distance inwardly from the series of vanes 19. In accordance with the invention a plurality of spaced longitudinal slots 20 is provided in the rotor 13. The slots 20 may occupy radial planes of the rotor 13 and the side walls of the slots are flat and substantially parallel. The inner walls of the slots 20 are pitched or inclined relative to the longitudinal axis of the rotor 13. In practice the inner portions of the slots 20 are enlarged. In the construction illustrated the inner portions of the slots 20 have round or cylindrical enlargements in the nature of sloping bores 21. The walls of the pitched bores 21 form the inclined inner walls of the slots 20.

The rotor 13 is equipped with impeller blades 22 for imparting rotation to the liquid in the casing 12. A blade 22 is arranged in each slot 20 and when the blades are in their operative positions they project beyond the periphery of the rotor. The outer portions of the blades 22 are shaped to effectively impart the rotary motion of the rotor 13 to the liquid in the casing 12. As illustrated in Fig. 2 of the drawing, the outer active portions of the blades 22 are curved or pitched in a direction opposite to the pitch or curvature of the vanes 19. The projecting blades 22 moving through the liquid in the casing 12 cause the liquid to rotate and it will be seen that the speed of rotation of the liquid is dependent upon the extent of projection of the blades 22 from the rotor 13.

The control 14 is operable to vary the extent of projection of the blades 22 from the rotor 13 to govern the speed of rotation of the driven shaft 11. The blades 22 are supported by the rotor 13 for radial movement. The inner edge of each blade 22 carries an enlargement or flange 23 which slidably fits a bore 21. The engagement of the flanges 23 in the bores 21 prevents the outward displacement of the blades 22 from the slots 20. As above described, the bores 21 are pitched with respect to the longitudinal axis of the rotor 13 and when the blades 22 are moved longitudinally in their slots 20 the cooperation of the flanges 23 with the bores 21 produces radial movement of the blades. In the form of the invention illustrated the blades 22 are considerably shorter than the rotor 13 and have substantial axial movement in their slots 20. This permits adjustment of the blades 22 beween positions where their outer edges are substantially flush with the periphery of the rotor 13 and positions where their outer edges are adjacent the vanes 19. When the vanes 22 are fully retracted little or no rotation is imparted to the liquid in the casing 12 and the casing 12 remains stationary. When the blades 22 are fully projected to have their outer edges adjacent the vanes 19 the casing 12 is caused to rotate at substantially the same speed as the drive shaft 10. Fig. 2 of the drawing shows the blades 22 at intermediate positions where the driven shaft 11 rotates at an intermediate or medium speed. Longitudinal grooves or recesses 24 may be provided in the surface of the rotor 13 at the mouths of the slots 20 to receive the pitched or curved outer portions of the blades 22 so that the blades may be retracted to positions where they are substantially flush with the periphery of the rotor.

The control 14 includes a simple fluid pressure actuated means for moving the blades 22. The drive shaft 10 is tubular or is provided with a cylinder opening 25 joining a central opening 25ᵃ in the rotor. As illustrated, the drive shaft 10 may be bored from its outer end to have the cylinder opening 25 and the outer end of the opening may be closed by a threaded plug 26. A piston 27 is operable in the cylinder opening 25 and is equipped with sealing means 28 which seals with the wall of the cylinder opening 25 so that the piston may be moved in one direction by fluid pressure. A spring 29 is arranged in the opening 25ᵃ and is under compression between the inner end of the piston 27 and the inner wall of the opening 25ᵃ to urge the piston in the other direction.

The piston 27 is operatively connected with the several rotor blades 22. A slot 30 which extends longitudinally of the rotor 13 connects each bore 21 with the cylinder opening 25ᵃ. Pins 31 are fixed to the piston 27 and project outwardly through the slots 30. The pins 31 slidably engage in radial openings 32 in the flanges 23 of the blades 22. The slots 30 are of such length that they allow for the complete range of longitudinal movement of the blades 22. It will be seen that when the piston 27 is moved outwardly by the spring 29 the blades 22 are simultaneously moved radially outward by reason of the engagement of their flanges 23 in the bores 21. This results in an increase in the speed of rotation of the liquid in the casing 12 and an increase in the speed of rotation of the driven shaft 11. When the piston 27 is moved inwardly against the spring 29 the resultant longitudinal movement of the blades 22 is accompanied by radial retraction of the blades and the speed of rotation of the liquid in the casing and the speed of rotation of the driven shaft 11 are reduced.

The control 14 further includes means responsive to the speed of rotation of the driven shaft 11 for supplying fluid under pressure to the cylinder opening 25. This means includes a suitable pump 33 arranged adjacent the shaft 11. The pump 33 may be a simple gear pump or other suitable positive displacement pump. The pump 33 is driven by the shaft 11. In the drawing I have shown a gear 34 fixed on the boss 15 to mesh with a pinion or gear 35 fixed on the shaft of the pump 33. A conduit or pressure line 36 extends from the high pressure side of the pump 33 to a manifold or sleeve 37 which surrounds the drive shaft 10. The sleeve 37 is preferably stationary and I have shown it supported by a suitable bracket 38. Packing glands or other sealing means 39 are provided in the opposite ends of the sleeve 37 to seal with the drive shaft 10. The sleeve 37 is provided with an internal annular chamber 40 and the fluid pressure line 36 from the pump 33 communicates with this chamber. One or more ports 41 is provided in the wall of the drive shaft 10 to communicate with the chamber 40. The ports 41 maintain the cylinder opening 25 in communication with the chamber 40 and the pump line 36.

It will be observed that when the speed of rotation of the driven shaft 11 increases the pump 33 is operated at an increased rate to provide for an increase in the pressure on the fluid acting on the piston 27. This moves the piston inwardly and causes retraction or partial retraction of the blades 22 to reduce the speed of rotation of the casing 12 and thus compensate for the increased speed of rotation of the shaft 11. When the speed of rotation of the driven shaft 11 is lessened the pump 33 operates at a slower rate and there is a reduction on the pressure acting upon the piston 27 with the result that the blades 22 are projected to increase the speed of rotation of the casing 12 and shaft 11.

The control 14 further includes means for changing or regulating the normal or selected differential in the speeds of rotation of the shafts 10 and 11. A by-pass line 43 extends from the pressure line 36 to the low pressure side of the pump 33 and the fluid handled by the pump 33 circulates through this by-pass. A manually regulable valve 44 such as a needle valve, is interposed in the line 43 to govern the rate of circulation of fluid through the by-pass. It will be seen that by regulation of the valve 44 the normal fluid pressure delivered to the cylinder 25 may be varied at will to govern the differential in the speeds of rotation of the two shafts 10 and 11. A liquid reservoir R may communicate with the by-pass line 43 so that the control means is at all times supplied with the operating fluid.

It is believed that the operation of the drive provided by this invention will be readily understood from the foregoing detailed description. The valve 44 may be set to provide for the required or selected differential in the speeds of rotation of the drive shaft 10 and driven shaft 11. So long as the speed of rotation of the drive shaft 10 remains substantially constant the driven shaft 11 is also rotated at a constant rate of speed. If the speed of rotation of the drive shaft 10 changes the speed of rotation of the driven shaft 11 likewise changes. The drive of the present invention automatically compensates for such changes in speed of rotation of the driven shaft 11 to maintain its speed substantially constant. When the speed of rotation of the driven shaft 11 increases the pressure of the fluid acting on the piston 27 is increased and the piston is moved inwardly. This causes inward radial movement of the blades 22 with the result that the blades are less effective in imparting rotation to the liquid in the casing 12 and the speed of rotation of the casing 12 and shaft 11 is reduced. This automatically compensates for the unwanted increase in the speed of rotation of the driven shaft 11. In the event that the speed of rotation of the driven shaft 11 decreases the pump 33 operates at a slower rate and there is a reduction in the pressure on the fluid in the cylinder opening 25. As a result the spring 29 moves the piston outwardly. This causes radial outward movement of the rotor blades 22. The blades 22 projected to an increased extent are more effective in rotating the liquid in the casing 12 and the speed of rotation of the casing 12 and the shaft 11 is increased to compensate for the unwanted decrease in the speed of its rotation. It is to be observed that the above described operations of the drive are entirely automatic and serve to maintain the speed of the driven shaft 11 substantially constant.

Having described only a typical preferred form and application of my invention, I do not wish to be limited or restricted to the specific details herein set forth, but wish to reserve to myself any variations or modifications that may appear to those skilled in the art or fall within the scope of the following claims:

Having described my invention, I claim:

1. A drive for connecting a drive shaft and a driven shaft including a hydraulic drive interposed between the shafts, the drive including a liquid carrying case carried by one shaft and vanes in the case and carried by the other shaft, the hydraulic drive including a wedge member carried by the last mentioned shaft and slidably supporting the last mentioned vanes, a part movable to shift the last mentioned vanes relative to the wedge member to control the ratio of the speeds of rotation of the shafts, and means responsive to the speed of rotation of the driven shaft for governing said part including cylinder and piston means for moving said part, and pump means independent of the hydraulic drive operated by the driven shaft for supplying fluid under pressure to the cylinder and piston means.

2. A drive for connecting a drive shaft and a driven shaft including a hydraulic drive interposed between the shafts, the drive including a liquid carrying case carried by one shaft and vanes in the case and carried by the other shaft, the hydraulic drive including a member carried by the last mentioned shaft tapered lengthwise of the shaft and slidably supporting the last mentioned vanes, a part movable to shift the last mentioned vanes lengthwise of said member to control the ratio of the speeds of rotation of the shafts, and means responsive to the speed of rotation of the driven shaft for moving said part including cylinder and piston means for moving said part in one direction, spring means for moving said part in the other direction, and means driven directly by the driven shaft for supplying fluid under pressure to the cylinder and piston means independently of the hydraulic drive.

3. A drive for connecting a drive shaft and a driven shaft including an element rotatable with each shaft, one element being a liquid containing casing, the other being a rotor in the casing, vane means on each element, one vane means being operable to impart rotation to the liquid in the casing, the other vane means being operable to receive rotary motion from the liquid, one of said vane means being controllable to extend greater or lesser distances into the liquid to vary the ratio of the speeds of rotation of the shafts, and means responsive to the speed of rotation of the driven shaft for controlling said controllable vane means, including fluid pressure actuated means for acting on said controllable vane means, and means driven by the driven shaft for supplying fluid under pressure to the fluid pressure actuated means.

4. A drive for connecting a drive shaft and a driven shaft including an element rotatable with each shaft, one element being a liquid containing casing, the other being a rotor in the casing, vane means on each element, one vane means being operable to impart rotation to the liquid in the casing, the other vane means being operable to receive rotary motion from the liquid, one of said vane means being controllable to extend greater or lesser distances into the liquid to vary the ratio of the speeds of rotation of the shafts, and means responsive to the speed of rotation of the driven shaft for controlling said controllable vane means, including cylinder and piston means for acting on said controllable vane means, and pump means driven by the driven shaft for supplying fluid under pressure to the cylinder and piston means.

5. A drive for connecting a drive shaft and a driven shaft including an element rotatable with each shaft, one element being a liquid containing casing, the other being a rotor in the casing, vane means on each element, one vane means being operable to impart rotation to the liquid in the casing, the other vane means being operable to receive rotary motion from the liquid, one of said vane means being controllable to extend greater or lesser distances into the liquid to vary the ratio of the speeds of rotation of the shafts, and means responsive to the speed of rotation of the driven shaft for controlling said controllable vane means, including pressure responsive means for acting on the controllable vane means, a pump driven by the driven shaft for supplying fluid under pressure to the pressure responsive means, a by-pass line connecting the inlet and outlet of the pump, and a valve in said line operable to vary the normal ratio of the speeds of rotation of the shafts.

6. A drive for connecting a drive shaft and a driven shaft comprising a liquid-containing casing rotatable with one shaft, a rotor in the casing rotatable with the other shaft, vanes on the casing operable to transmit rotation between the casing and the liquid therein, blades on the rotor operable to transmit rotation between the rotor and the liquid, the blades being movable to vary the degree of their rotation transmitting action, and means responsive to the speed of rotation of the driven shaft for determining the position of the blades, including fluid pressure actuated means for moving the vanes, and means driven by the driven shaft for supplying fluid under pressure to the fluid pressure actuated means.

7. A drive for connecting a drive shaft and a driven shaft comprising a liquid-containing casing rotatable with one shaft, a rotor in the casing rotatable with the other shaft, vanes on the casing operable to transmit rotation between the casing and the liquid therein, radially movable blades on the rotor operable to transmit rotation between the rotor and the liquid and movable to vary the degree of their rotation transmitting action, spring means for moving the blades outwardly to increase their rotation transmitting action, and means responsive to an increase in the speed of rotation of the driven shaft for moving the blades inwardly to reduce their rotation transmitting action.

8. A drive for connecting a drive shaft and a driven shaft comprising a liquid-containing casing rotatable with one shaft, a rotor in the casing rotatable with the other shaft, vanes on the casing operable to transmit rotation between the casing and the liquid therein, radially movable blades on the rotor operable to transmit rotation between the rotor and the liquid and movable to vary the degree of their rotation transmitting action, a cylinder in one of said shafts, a piston in the cylinder operatively connected with the blades, spring means acting on the piston to move the blades outwardly, and means driven by the driven shaft for supplying fluid under pressure to the cylinder to act on the piston and move the blades inwardly when the speed of rotation of the driven shaft increases.

9. A drive for connecting a drive shaft and a driven shaft comprising a liquid-containing casing rotatable with one shaft, a rotor in the casing rotatable with the other shaft, vanes on the casing operable to transmit rotation between the casing and the liquid therein, the rotor having longitudinal slots with pitched walls, blades in the slots projecting from the rotor to transmit rotation between the rotor and liquid, the blades being movable longitudinally in the slots to be moved radially through cooperation with said pitched inner walls, a cylinder in one of the shafts, a piston in the cylinder operatively connected with the blades, spring means for moving the piston in one direction and tending to cause radial outward movement of the blades, and means driven by the driven shaft for supplying fluid under pressure to the cylinder to move the piston in the other direction and cause radial inward movement of the blades when the speed of rotation of the driven shaft increases.

ARTHUR L. ARMENTROUT.